(12) United States Patent
McBlain et al.

(10) Patent No.: US 7,502,457 B2
(45) Date of Patent: Mar. 10, 2009

(54) OUTBOUND CALL RULES ROUTING

(75) Inventors: Thomas Joseph McBlain, Arlington Heights, IL (US); Nancy Ann Book, Naperville, IL (US); Carol Shifrin Gruchala, Naperville, IL (US); William M. Moy, Wheeling, IL (US); Peter Robert Neuwald, Milwaukee, WI (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1471 days.

(21) Appl. No.: 10/084,330

(22) Filed: Feb. 28, 2002

(65) Prior Publication Data

US 2003/0161459 A1    Aug. 28, 2003

(51) Int. Cl.
    *H04M 3/42* (2006.01)
(52) U.S. Cl. ............... 379/210.01; 379/112.01; 379/220.01; 455/445; 709/225
(58) Field of Classification Search ............ 379/220.01, 379/352, 114.22, 144.01, 207.03, 88.02, 379/204.01, 211.02, 93.24, 210.01, 112.01; 455/445; 709/225; 370/352
See application file for complete search history.

(56) References Cited

U.S. PATENT DOCUMENTS

| | | | |
|---|---|---|---|
| 4,232,199 A | 11/1980 | Boatwright et al. |
| 4,266,098 A | 5/1981 | Novak |
| 4,296,463 A | 10/1981 | Dalboussiere et al. |
| 4,429,188 A | 1/1984 | Allen |
| 4,611,094 A | 9/1986 | Asmuth et al. |
| 4,611,096 A | 9/1986 | Asmuth et al. |
| 4,788,718 A | 11/1988 | McNabb et al. |
| 4,860,347 A | 8/1989 | Costello |
| 4,878,240 A | 10/1989 | Lin et al. |
| 4,897,866 A | 1/1990 | Majmudar et al. |
| 4,899,373 A | 2/1990 | Lee et al. |
| 5,054,055 A | 10/1991 | Hanle et al. |
| 5,109,408 A | 4/1992 | Greenspan et al. |
| 5,200,995 A | 4/1993 | Gaukel et al. |

(Continued)

FOREIGN PATENT DOCUMENTS

EP      0611083      8/1994

(Continued)

OTHER PUBLICATIONS

Kramer, T., "Standalone Call Accounting: The Hardware, the Software, and the Enterprise", Communiations Convergence, Mar. 5, 2001, downloaded from http://www.cconvergence.com/shared/article/showArticle.jhtml?articleId=8711796&pgno=1 on Jun. 12, 2004.

(Continued)

*Primary Examiner*—Gerald Gauthier
(74) *Attorney, Agent, or Firm*—Greenblum & Bernstein, P.L.C.

(57) ABSTRACT

An AIN service for provides a subscriber the ability to configure outbound call routing rules. Using telecommunications variables such as time of call, call busy status, call unanswered status, and numbers dialed, a subscriber is enabled to configure a service control point to perform an action such as forward a call, send a page with a message, use a dial-around number, or send a PIN. A web browser interface may be used by the subscriber to configure the SCP.

23 Claims, 7 Drawing Sheets

U.S. PATENT DOCUMENTS

| | | | |
|---|---|---|---|
| 5,222,125 A | 6/1993 | Creswell et al. | |
| 5,241,588 A | 8/1993 | Babson, III et al. | |
| 5,247,571 A | 9/1993 | Kay et al. | |
| 5,294,229 A | 3/1994 | Hartzell et al. | |
| 5,333,185 A | 7/1994 | Burke et al. | |
| 5,337,351 A | 8/1994 | Manabe et al. | |
| 5,345,380 A | 9/1994 | Babson, III et al. | |
| 5,353,331 A | 10/1994 | Emery et al. | |
| 5,396,546 A | 3/1995 | Remillard | |
| 5,398,220 A | 3/1995 | Barker | |
| 5,404,396 A | 4/1995 | Brennan | |
| 5,436,957 A | 7/1995 | McConnell | |
| 5,438,568 A | 8/1995 | Weisser, Jr. | |
| 5,444,768 A | 8/1995 | Lemaire et al. | |
| 5,448,631 A | 9/1995 | Cain | |
| 5,463,685 A * | 10/1995 | Gaechter et al. | 379/210.01 |
| 5,467,388 A | 11/1995 | Redd, Jr. et al. | |
| 5,469,500 A | 11/1995 | Satter et al. | |
| 5,479,487 A | 12/1995 | Hammond | |
| 5,483,582 A * | 1/1996 | Pugh et al. | 379/144.01 |
| 5,533,102 A | 7/1996 | Robinson et al. | |
| 5,544,320 A | 8/1996 | Konrad | |
| 5,548,566 A | 8/1996 | Barker | |
| 5,550,909 A | 8/1996 | Chanda et al. | |
| 5,572,583 A | 11/1996 | Wheeler, Jr. et al. | |
| 5,579,384 A | 11/1996 | Seymour | |
| 5,583,564 A | 12/1996 | Rao et al. | |
| 5,592,541 A | 1/1997 | Fleischer, III et al. | |
| 5,615,252 A | 3/1997 | Sizer, II et al. | |
| 5,625,676 A | 4/1997 | Greco et al. | |
| 5,629,978 A | 5/1997 | Blumhardt et al. | |
| 5,642,410 A | 6/1997 | Walsh et al. | |
| 5,655,013 A | 8/1997 | Gainsboro | |
| 5,657,451 A | 8/1997 | Khello | |
| 5,680,446 A | 10/1997 | Fleischer, III et al. | |
| 5,687,212 A | 11/1997 | Kinser, Jr. et al. | |
| 5,696,815 A | 12/1997 | Smyk | |
| 5,740,438 A | 4/1998 | Ratcliff et al. | |
| 5,742,668 A | 4/1998 | Pepe et al. | |
| 5,751,707 A | 5/1998 | Voit et al. | |
| 5,754,636 A | 5/1998 | Bayless et al. | |
| 5,758,351 A | 5/1998 | Gibson et al. | |
| 5,764,748 A | 6/1998 | Rosenthal et al. | |
| 5,768,360 A * | 6/1998 | Reynolds et al. | 379/211.02 |
| 5,787,237 A | 7/1998 | Reilly | |
| 5,790,173 A | 8/1998 | Strauss et al. | |
| 5,796,806 A | 8/1998 | Birckbichler | |
| 5,796,950 A | 8/1998 | Sips et al. | |
| 5,799,073 A | 8/1998 | Fleischer, III et al. | |
| 5,802,157 A | 9/1998 | Clarke et al. | |
| 5,802,159 A | 9/1998 | Smolentzov et al. | |
| 5,805,587 A | 9/1998 | Norris et al. | |
| 5,822,419 A | 10/1998 | Enstone et al. | |
| 5,864,613 A | 1/1999 | Flood | |
| 5,867,562 A | 2/1999 | Scherer | |
| 5,870,549 A | 2/1999 | Bono, II | |
| 5,881,144 A | 3/1999 | Havens | |
| 5,892,822 A | 4/1999 | Gottlieb et al. | |
| 5,915,008 A | 6/1999 | Dulman | |
| 5,917,817 A | 6/1999 | Dunn et al. | |
| 5,920,618 A | 7/1999 | Fleischer, III et al. | |
| 5,933,490 A | 8/1999 | White et al. | |
| 5,933,778 A | 8/1999 | Buhrmann et al. | |
| 5,937,050 A | 8/1999 | Yue et al. | |
| 5,940,488 A | 8/1999 | DeGrazia et al. | |
| 5,946,381 A | 8/1999 | Danne et al. | |
| 5,958,016 A | 9/1999 | Chang et al. | |
| 6,240,441 B1 | 10/1999 | Sato et al. | |
| 5,982,774 A | 11/1999 | Foladare et al. | |
| 5,982,870 A | 11/1999 | Pershan et al. | |
| 5,999,611 A | 12/1999 | Tatchell et al. | |
| 6,028,917 A | 2/2000 | Creamer et al. | |
| 6,032,184 A | 2/2000 | Cogger et al. | |
| 6,038,296 A | 3/2000 | Brunson et al. | |
| 6,058,178 A | 5/2000 | McKendry et al. | |
| 6,058,489 A | 5/2000 | Schultz | |
| 6,097,802 A | 8/2000 | Fleischer, III et al. | |
| 6,101,242 A * | 8/2000 | McAllister et al. | 379/88.02 |
| 6,104,799 A | 8/2000 | Jain et al. | |
| 6,115,040 A | 9/2000 | Bladow et al. | |
| 6,118,780 A | 9/2000 | Dunn et al. | |
| 6,125,126 A | 9/2000 | Hallenstal | |
| 6,134,310 A | 10/2000 | Swan et al. | |
| 6,160,877 A | 12/2000 | Tatchell et al. | |
| 6,161,128 A | 12/2000 | Smyk | |
| 6,167,122 A | 12/2000 | Titmuss et al. | |
| 6,173,437 B1 | 1/2001 | Polcyn | |
| 6,192,118 B1 | 2/2001 | Bayless et al. | |
| 6,195,678 B1 | 2/2001 | Komuro | |
| 6,195,697 B1 | 2/2001 | Bowman-Amuah | |
| 6,212,561 B1 | 4/2001 | Sitaraman et al. | |
| 6,233,330 B1 | 5/2001 | McClure et al. | |
| 6,246,751 B1 | 6/2001 | Bergl et al. | |
| 6,246,756 B1 | 6/2001 | Borland et al. | |
| 6,259,449 B1 | 7/2001 | Saxena et al. | |
| 6,263,064 B1 | 7/2001 | O'Neal et al. | |
| 6,301,350 B1 * | 10/2001 | Henningson et al. | 379/220.01 |
| 6,304,641 B1 * | 10/2001 | Culli et al. | 379/114.22 |
| 6,317,484 B1 | 11/2001 | McAllister | |
| 6,320,948 B1 | 11/2001 | Heilmann et al. | |
| 6,330,598 B1 | 12/2001 | Beckwith et al. | |
| 6,337,899 B1 | 1/2002 | Alcendor et al. | |
| 6,404,858 B1 * | 6/2002 | Farris et al. | 379/88.02 |
| 6,445,694 B1 | 9/2002 | Swartz | |
| 6,453,164 B1 * | 9/2002 | Fuller et al. | 455/445 |
| 6,456,706 B1 | 9/2002 | Blood et al. | |
| 6,463,145 B1 | 10/2002 | O'Neal et al. | |
| 6,529,596 B1 | 3/2003 | Asprey et al. | |
| 6,549,619 B1 | 4/2003 | Bell et al. | |
| 6,574,661 B1 | 6/2003 | Delano et al. | |
| 6,631,186 B1 | 10/2003 | Adams et al. | |
| 6,631,416 B2 | 10/2003 | Bendinelli et al. | |
| 6,640,239 B1 | 10/2003 | Gidwani | |
| 6,662,221 B1 | 12/2003 | Gonda et al. | |
| 6,671,365 B2 * | 12/2003 | Kemppainen | 379/220.01 |
| 6,678,827 B1 | 1/2004 | Rothermel et al. | |
| 6,728,238 B1 | 4/2004 | Long et al. | |
| 6,748,439 B1 | 6/2004 | Monachello et al. | |
| 6,804,716 B1 * | 10/2004 | Koch et al. | 709/225 |
| 6,850,605 B2 * | 2/2005 | Tiliks et al. | 379/114.05 |
| 6,931,115 B1 * | 8/2005 | Okamura | 379/207.03 |
| 7,023,837 B1 * | 4/2006 | Srinivasan | 370/352 |
| 7,139,385 B2 * | 11/2006 | Stroud et al. | 379/221.13 |
| 7,301,935 B1 * | 11/2007 | Chaturvedi et al. | 370/352 |
| 2001/0048738 A1 | 12/2001 | Baniak et al. | |
| 2001/0049737 A1 | 12/2001 | Carolan et al. | |
| 2002/0048352 A1 * | 4/2002 | Katayama | 379/93.24 |
| 2002/0054587 A1 | 5/2002 | Baker et al. | |
| 2002/0168055 A1 | 11/2002 | Crockett et al. | |
| 2003/0007621 A1 | 1/2003 | Graves et al. | |
| 2003/0076941 A1 | 4/2003 | Tiliks et al. | |
| 2003/0079028 A1 | 4/2003 | Kortum et al. | |
| 2003/0200321 A1 | 10/2003 | Chen et al. | |
| 2004/0199624 A1 | 10/2004 | Posson et al. | |
| 2004/0243708 A1 | 12/2004 | Stebbings | |
| 2005/0114794 A1 | 5/2005 | Grimes et al. | |

FOREIGN PATENT DOCUMENTS

| | | |
|---|---|---|
| EP | 0740480 | 10/1996 |
| WO | 92/09164 | 5/1992 |
| WO | 99/16230 | 4/1999 |
| WO | 99/20058 | 4/1999 |

| | | |
|---|---|---|
| WO | 00/65857 | 11/2000 |
| WO | 01/35240 | 5/2001 |

OTHER PUBLICATIONS

Lennox et al., "Call processing Language Framework and Requirements", RFC 2824, published May 2000.
Lennox et al., "CPL: A Language for User Control of Internet Telephony Services", Internet Engineering Task Force, IPTEL WG, published Oct. 25, 2000.
J. Rosenberg, "Introduction to CPL", Dynamicsoft, Winter 2001 Von Developers Conference, published Feb. 25, 2001.
"MegaHub PACE SMS—Service Management System- Advanced Intelligent Network Systems," Communications Corporation, Issue 0.4, Jul. 17, 1994.
Berman, Roger K., and Brewster, John H., "Perspectives on the AIN Architecture," IEEE Communications Magazine, Feb. 1992, pp. 27-32.
Advanced Intelligent Network (AIN) 0.1 Switching Systems Generic Requirements (Bellcore TR-NWT-001284), Issue 1, Aug. 1992.
Advanced Intelligent Network (AIN) 0.1 Switch-Service Control Point (SCP) Application Protocol Interface Generic Requirements (Bellcore TR-NWT-001285), Issue 1, Aug. 1992.
BT Technology Journal, vol. 13, No. 2 Apr. 1995, Ipswich GB. pp. 132-142, Marshall et al., "The information services supermarket".
Internet web pages by Dazil Internet Services, "Caller EyeDee," downloaded Dec. 2001.
Internet Web Pages by Z-Tel, "Personal Communications Center", dated Apr. 13, 2000 and May 15, 2000.
Internet Web Pages by TOSC International, "Cool Call", dated May 4, 2000.
Internet Web Pages by Phone.Com, "My Phone Services"., dated May 4, 2000.
"Next Generation Phone System", Internet web pages by CommWeb.com, Aug. 2, 2001.
"Teleglobe International Toll Free Services," www.teleglobe.com (Dec. 2002).
"Sprint Wholesale Toll-Free Services," http://sprintbiz.com/wholesale/products/toll_free_services.pdf (Jan. 2001).

* cited by examiner

Outbound Call Rules Routing
(Subscriber Input Screen)

| 300 Variable Type Field | 301 Equality Operator | 302 Variable Input Field | 303 Logical Operator |
|---|---|---|---|
| Number Dialed | = | Long Distance | AND |
| Time of Day | > | 7PM | OR |
| Time of Day | < | 6AM | |
| | | | |
| | | | |

| 304 Action | 305 Action Field Type | 306 Action Input Field | 307 Condition Operator |
|---|---|---|---|
| Prepend | Dial-around code | 1010555 | ELSE |
| Prepend | Dial-around code | 1010666 | |

Figure 3

OUTBOUND CALL RULES ROUTING

BACKGROUND OF THE INVENTION

1. Field of the Invention

The present invention relates to the field of telecommunications. More particularly, the present invention relates to a call routing service that enables subscribers to configure how outgoing calls are routed.

2. Acronyms

The written description provided herein contains acronyms that refer to various telecommunications services, components and techniques, as well as features relating to the present invention. Although some of these acronyms are known, use of these acronyms is not strictly standardized in the art. For purposes of the written description herein, the acronyms are defined as follows:

- Advanced Intelligent Network (AIN)
- Application Program Interface (API)
- Central Office Exchange Service (CENTREX)
- Common Object Request Broker Architecture (CORBA)
- Customized Dialing Plan (CDP)
- Direct Inward Dial (DID)
- Direct Outward Dial (DOD)
- End Office (EO)
- File Transfer Protocol (FTP)
- Graphical User Interface (GUI)
- Generic Data Interface (GDI)
- Initial Address Message (IAM)
- Off Hook Delay (OHD)
- Outbound Call Rules Routing (OCRR)
- Public Switched Telephone Network (PSTN)
- Specific Digit String (SDS)
- Service Control Point (SCP)
- Service Node/Intelligent Peripheral (SN/IP)
- Service Switching Point (SSP)
- Signaling System 7 (SS7)
- Signaling Transfer Point (STP)

3. Background Information

Caller's using a public switched telephone network (PSTN) are limited in their ability to route outbound calls. It is typical for a subscriber to only have the outgoing call options of selecting a local, local toll, and long distance carrier, and blocking particular outgoing call numbers when initially subscribing to a telecommunications service. Beyond these options, a caller has little to no flexibility on how a call is routed, unless the subscriber subsequently contacts the telecommunications provider and requests changes be made to the subscriber's service. Even in this case, a caller is limited to changing local, toll, and long distance carriers and selecting outgoing numbers to block. These modifications may be done only so many times and at a limited frequency before it becomes a nuisance to the caller and the telecommunications company. While it is possible to use dial-around codes to access different long distance carriers, this too could be burdensome to a caller over time and again, is limited to only long distance service modifications.

Moreover, in today's busy, information age world, it is not uncommon for individuals to have several means by which they are reachable by a communications device such as a telephone, mobile phone, or pager—each of these devices having a separate number. Keeping track of these numbers and the access codes that may be associated with these devices can be very burdensome to a caller. To make matters more difficult, a party to which the caller is trying to contact may have a different device or number by which they are reachable depending on the time of day, day of week, day of year, or specific date.

Further adding to a caller's burden, a caller may have access to several telecommunications services, via dial-around numbers, that provide different cost savings depending on the number dialed; the call type (e.g., local, local toll, and long distance); and time of call (e.g., time of day, day of week, day of year, and specific date). To take advantage of optimal cost savings given today's telecommunications systems, a caller must be able to calculate which telecommunications service to use given the number dialed, the call type, and time of the call. This, too, is often a burden to a caller who may not have the time or information readily available to make the calculations.

Moreover, even if the caller is able to remember all this information, make the necessary calculations, and enter the appropriate numbers into the caller's communications device, it may be the case that the called party is unreachable at the number initially dialed (e.g., the line is busy, the called party doesn't answer, or an answering machine answers). If this is the case, the caller may have to go through the same process over and over again; the caller dialing numbers repeatedly until the caller reaches the called party or simply gives up. This can be especially annoying and unsafe if the caller is driving or is in some other precarious situation.

Today, communication devices come programmable enabling callers to program strings of numbers to be associated with a particular call recipient via keypad or voice input systems. Some telecommunications service providers also offer these services. With these devices and services, a caller has the convenience of number storage and speed dialing. However, such devices and services are not programmable to select which numbers to use given the time of day, day of week, day of year, or specific date. Nor are such devices capable of determining which telecommunications service (e.g., long distance service) to use given the time of the call, the number dialed, or the call type. Furthermore, these devices and services are unable to determine what to do when a called party is unreachable at a particular number. Moreover, such devices and services are cumbersome to program given almost all programming is by means of a dialing pad or voice input system.

Communications using today's telecommunications systems can be cumbersome to a caller since the systems simply do not allow subscriber's to configure their outgoing call options based on the following variables that are common to each outgoing call: Number dialed, the call disposition (e.g., busy, unanswered, answering service reached, and the call is disconnected by the subscriber or telecommunications system), and the time of the call.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which:

FIG. 3 is an exemplary display that a user may use to input routing rules to an SCP, according to an aspect of the present invention;

DETAILED DESCRIPTION OF EMBODIMENTS

Figure 1:
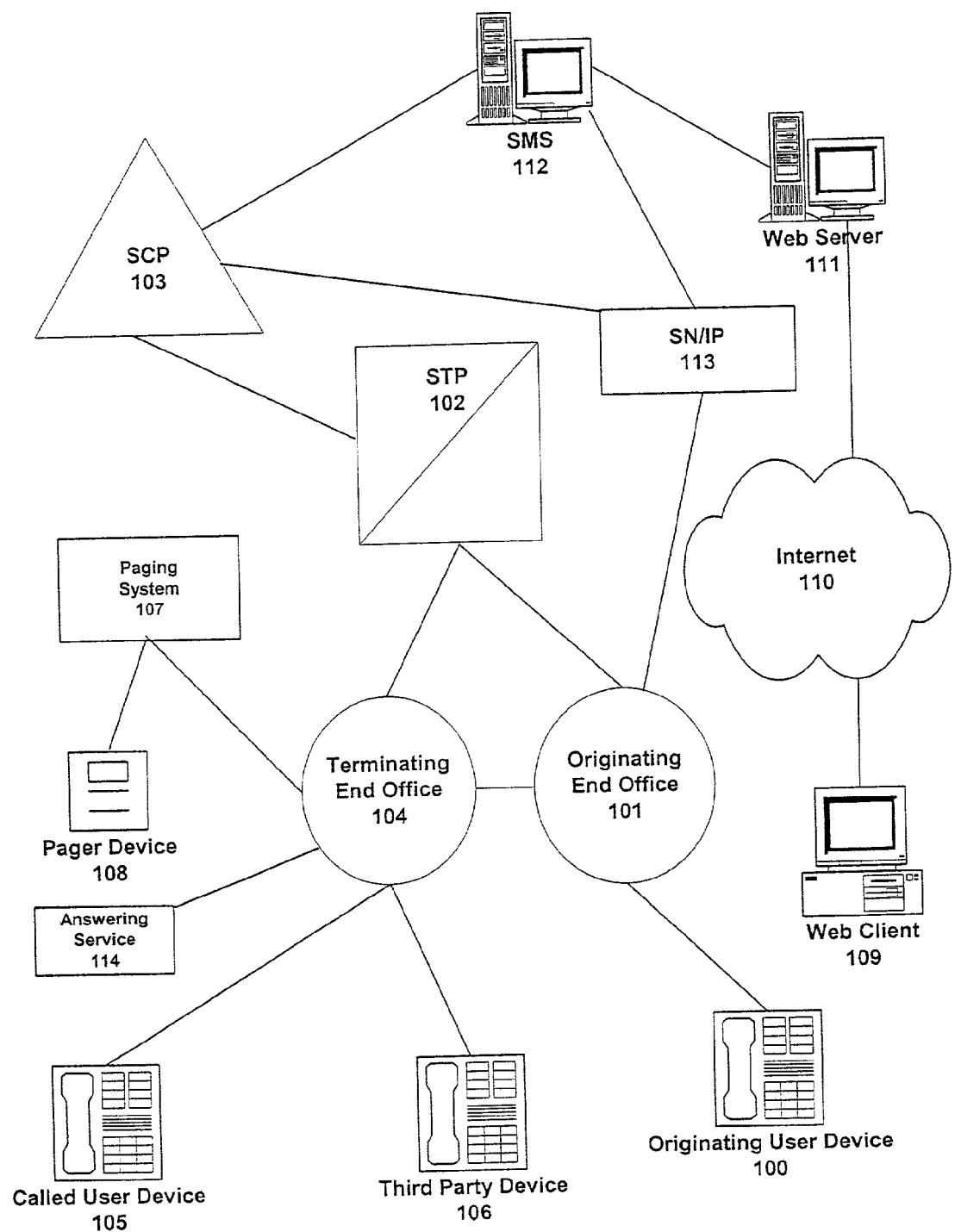
FIG. 1 is a system diagram showing an exemplary telecommunications network for implementing outbound call rules routing, according to an aspect of the present invention.

The present invention relates to an outbound call-routing (OCRR) service provided by an advanced intelligent network (AIN) that resolves the previously identified problems. The invention provides a subscriber the ability to configure outbound call routing rules using variables common to a call such as the dialed number, call disposition, and time. With the OCRR service, a subscriber is enabled to configure a service control point which instructs a switch and/or service node/intelligent peripheral (SN/IP) to perform an action such as forward a call, send a page, use a dialing prefix (e.g. a dial-around number), disallow a call, or prompt for a PIN. A web browser interface may be used by the subscriber to configure the service control point.

In view of the above, the present invention through one or more of its various aspects and/or embodiments is presented to accomplish one or more objectives and advantages, such as those noted below.

In an embodiment of the invention, a system performs outbound call control using a subscriber's outbound call rule information using a service control point and a switch. The SCP receives and stores outbound call rule information and sends at least one SCP control message based on action information when a switch message is received and a condition based on condition information is met. The stored outbound call rule information is configurable by a subscriber and includes at least one rule. Each rule includes a portion of the action information and a portion of the condition information. The condition information includes at least one condition related to a time, date, or a call disposition. The switch sends a switch message in response to a call being placed. The switch, additionally, receives the SCP control message, and initiates an action based on the action information.

According to an aspect of the embodiment, the system that performs outbound call control using the subscriber's outbound call rule information may include condition information which includes at least one condition related to at least a portion of a number dialed. Moreover, the system may include action information including information related to forwarding the call to a number other than a dialed number. Furthermore, the system may include action information including information related to submitting a PIN number. The system may also include action information including information related to sending a page to a paging device. Moreover, the system may include action information including information related to disallowing the call. Furthermore, the system may include action information including information related to prepending at least one prefix number to a dialed number sequence. Still further, the action information may include a prefix number including dial-around code information.

According to another aspect of the embodiment, the system may include call rule information, wherein, at least one rule includes more than one action. The system may also include call rule information, wherein, at least one rule includes more than one condition. Moreover, the system may also include outbound call rule information including more than one rule.

In another embodiment of the invention, a method performs outbound call control using a subscriber's outbound call rule information including receiving outbound call rule information configured by a subscriber. The method further including storing the outbound call rule information in a service control point and sending from a service control point to a switch at least one service control point control message based on condition information when a switch message is received and a condition based on condition information is met. The stored outbound call rule information includes at least one rule and each rule includes a portion of the action information and a portion of the condition information. The condition information includes at least one condition related to a time or call disposition.

According to another aspect of the invention, the method includes sending from a switch to a service control point a switch message in response to a call being placed to a dialed number and receiving by the switch from the service control point the control message. The method also includes initiating by the switch an action based on the action information.

According to another aspect of the invention, the method may include determining whether at least a portion of a number dialed satisfies at least one condition of the outbound call rule information. Additionally, the method may include forwarding the call to a number other than the dialed number based on the action information of the outbound call rule information. Furthermore, the method may include submitting a PIN number based on the action information of the outbound call rule information. Still further, the method may include sending a page to a paging device based on the action information of the outbound call rule information. Moreover, the method may include disallowing the call based on the action information of the subscriber's outbound call rule information. The method may also include prepending at least one prefix number to a dialed number sequence based on the action information of the outbound call rule information. Furthermore, the method may include prepending dial-around code information to the dialed number sequence based on the action information of the outbound call rule information. Moreover, the method may include initiating by the switch more than one action based on the action information of the rule. Still further, the method may include determining whether call information in the switch message satisfies more than one condition of the rule. Finally, the method may include determining whether call information in the switch message satisfies conditions of more than one rule.

The various aspects and embodiments of the present invention are described in detail below.

The Outbound Call Rules Routing System

The present invention is an AIN based system and method that allows a subscriber connected to a telecommunications network to configure the routing of outbound calls using a web browser.

FIG. 1 illustrates an exemplary telecommunications network in association with the present invention for connecting calls and programming a service control point (SCP). The system includes a call originating user device 100, an originating end office (EO) service switching point (SSP) 101, a signaling transfer point (STP) 102, a SCP 103, a terminating EO SSP 104, a called user device 105, a third party device 106, a paging system 107, and a pager device 108. The system further includes a web client 109 connected via the Internet 110 to a web server 111, a service management system (SMS) 112, a service node/intelligent peripheral (SN/IP) 113, and an answering service 114.

By way of example, the user devices 100, 105, and 106 of the present invention may be standard telephones. These devices may also be special devices used when communicating over facsimile, Central Office Exchange Service (CENTREX), Direct inward Dial (DID), or Direct Outward Dial (DOD) systems, or any other device used to communicate over a telecommunications system.

The originating EO 101 is an SSP for the originating user device 100 and the terminating EO 104 is an SSP for the called user device 105, third party device 106 and the paging system 107. While the originating end office 101 and the terminating EO are shown as separate entities, the terminating EO and the originating EO functions may be performed by the same SSP. The EOs 101 and 104 may include, for example, 5ESS switches with a minimum switch generic of 5E14 manufactured by Lucent Technologies, Inc.; DMS-100 switches with a minimum switch generic of NA015 manufactured by Nortel Networks Corporation (Nortel); or EWSD switches with a minimum switch generic of Release 17 with patch set 170 and Release 18 with patch set 29 available from Siemens Information and Communication Networks, Inc. The switches may utilize an AIN Release 0.1 protocol.

The SCP 103 may be implemented with the Telecordia Integrated Service Control Point, loaded with ISCP software Version 4.4 (or higher), or may also be implemented using the Telecordia Integrated Service Control Point Current Generation Platform (ISCP)(CGP) with Release version 5.0.0.13; the ISCP Next Generation Platform (NGP) with Release version 6.4.2.1; and the Lucent Service Control Point (LSCP) with Release 94 and Service Package available from Telecordia, Murray Hill, N.J. Exemplary service control points also include the Application Version 6 (SPA V6) or later. The SCP 103 is configured to process telephone calls, but can also be configured to process facsimile, CENTREX, DID, DOD, and "800" services.

The call service logic of the present invention may be upgraded to accommodate future AIN releases and protocols and future trigger types. Specifications of AIN Release 0.1 SSPs may be found in Telecordia GR-1299-CORE, AIN 0.1 Switch-Service Control Point Application Protocol Interface Generic Requirements, and Telecordia GR-1298-CORE, AIN 0.1 Switching Systems Generic Requirements, the disclosures of which are expressly incorporated by reference herein in their entireties.

While SCPs are primarily discussed and referred to and shown in one or more of the accompanying drawings, it is noted that an Integrated Service Control Point (ISCP) may be employed as well, and that the terms are used interchangeably herein. It is further noted that SCPs/ISCPs may be deployed in mated pairs to ensure survivability and reliability of the network.

The interface between the service switching points and the service control point may be the Telecordia AIN GR-1299, entitled "Switch-Service Control Point (SCP)/Adjunct Interface." The messages transmitted between the SSPs 101 and 104 and SCP 103 are all formatted in accordance with the Signaling System 7 (SS7) transaction capabilities applications protocol (TCAP). The STP 102 connects the EOs 101 and 104 with the SCP 103. Integrated Services Digital Network User Part (ISUP) signaling is utilized between the SSPs 101 and 104.

The web client 109 connects to the web server 111 over a network which may be the Internet 110. The web client 109 may be a web browser, for example, residing on a personal computer or any other device that can communicate with web server 111. The web client's graphical user interface (GUI) enables a user to modify SCP outbound routing information pertaining to the user. An exemplary GUI is shown in FIG. 3.

The Internet 110 is a network infrastructure that provides the web client 109 connectivity to the web server 111. The Internet 110 need not be the only network through which the web client 109 communicates with the web server 111. Most networks that can provide the web client 109 and web server 111 connectivity to each other could be used in lieu of the Internet 110.

The web server 111 is connected to a network such as the Internet 110 enabling the web client 109 to communicate with the web server 111. The web server 111 is also connected to the SMS 112. The web server 111 contains and provides the web pages used by the web client 109 to update the outbound routing information stored in the SCP 103.

The SMS 112 communicates with the SCP 103, web server 111, and SN/IP 113 and enables users to manipulate outbound call routing information using a web client 109 connected to the web server 111. The SMS 112 downloads outbound routing information from the SCP 103 and allows a subscriber with a web client 109 to manipulate an outbound routing table pertaining to a particular subscriber. Once the subscriber is finished modifying the table, the SMS 112 uploads the table back to the SCP 103. The SMS may be implemented on a SUN Enterprise 450 server using a Solaris 8.0 operating system. Communications between the SMS 112 and the web server 111 may utilize CORBA.

The SN/IP 113 is a system which enables a telecommunications system to interact with various devices such as a messaging system, paging system, or menu driven system. It is connected to the SMS 112 and an EO 101. The SN/IP 113 may be programmed using an SMS 112.

The answering service 114 may be a service provided by a telecommunications provider or some other third party provider. Moreover, the answering service 112 could simply be an answering machine co-located with the called user device 105.

SCP OCRR Logic

Figure 2:
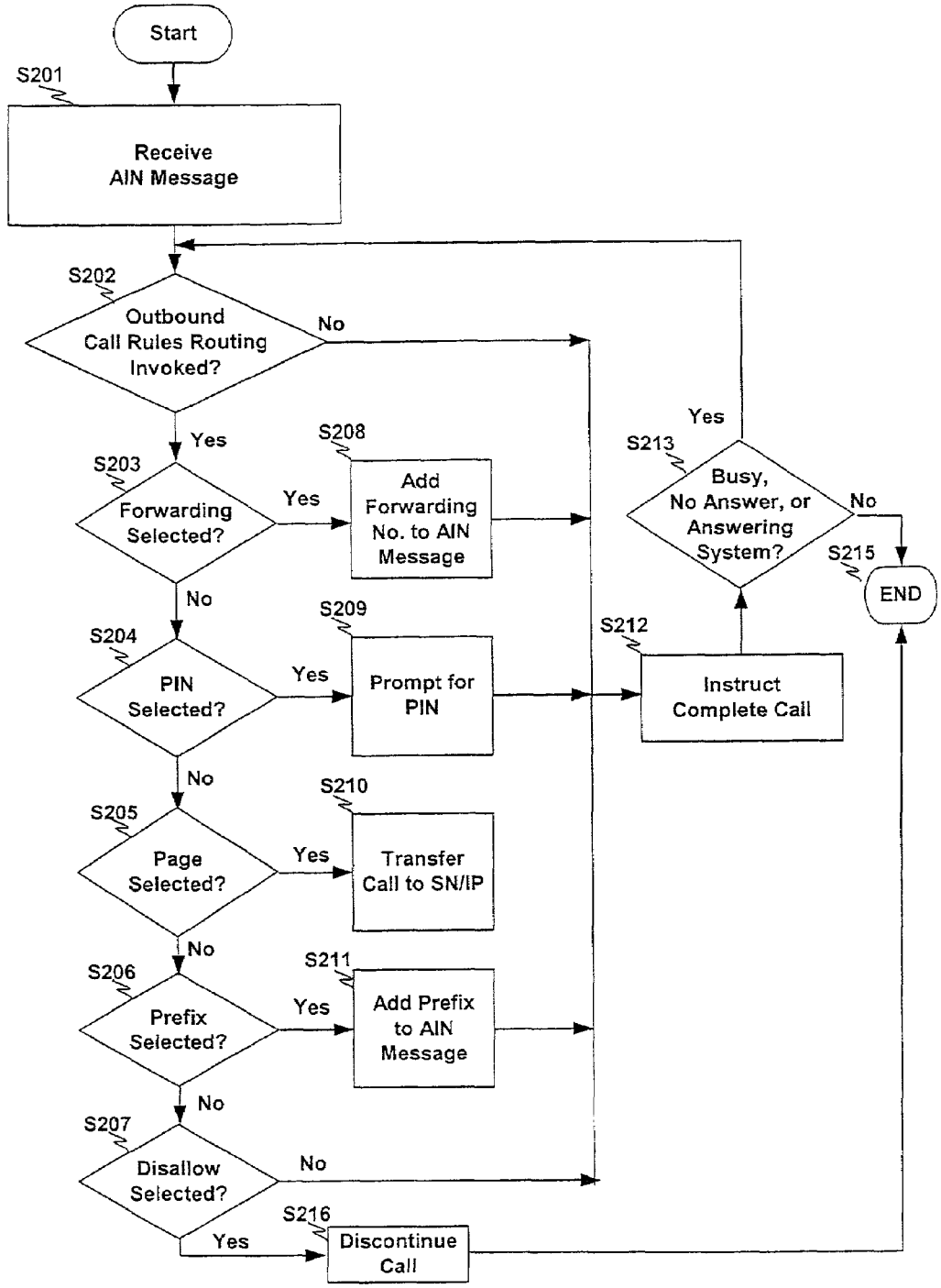
FIG. 2 is an exemplary flow diagram showing how a service control point processes routing instructions, according to an aspect of the present invention.

FIG. 2 shows an exemplary flow chart of how the OCRR service logic of the SCP 103 routes an outbound call. At step S201, the SCP 103 waits for a switch message (e.g., an AIN triggered query). When a trigger is received, such as an off-hook delay (OHD) trigger or a customized dialing plan (CDP) trigger, the SCP 103 determines whether the OCRR service is to be invoked at step S202. The SCP 103 makes this determination by comparing the current call information conditions associated with several call parameters.

There are three major categories of conditions. First are conditions based on digits the customer dialed using parameters such as: the complete dialed number, number plan area (NPA) number, NPA and NXX prefix number, any other groupings of a dialed number with the form NPA NXX-XXXX—where the X represents any digit; and operator numbers (e.g. "0" and "411"). Dialed number parameters also include whether the call is to a local, local toll, or long distance number. Second are conditions based on time using parameters such as: time of day, day of week, day of year, and specific date. Third are conditions based on the disposition of the call using parameters such as: dialed number busy or disconnected by subscriber or telecommunications system; dialed number not answered; and dialed number answered by answering system.

If the current call information is determined by the SCP 103 to fulfill a condition associated with the subscriber's criteria provided in the SCP 103 outbound routing information, the SCP 103 then implements an action at steps S202-S212 selected by the subscriber such as: forward a call to a different number, send a PIN or prompt for a PIN as part of a call, automatically page a certain number and send a message, disallow a call, or automatically prepend a number sequence such as a 101-XXXX dial-around code; where the X represents any digit.

The condition and action may be relatively simple as shown by the following logical constructs, for example:
if the Dialed Number=555550000, then Forward to 5555551111
if the Time of Day>=7 PM, then Page (5555551111 and Send Message (5555552222)).

As an example of how flexible the OCRR system is, a subscriber may use wild card variables enabling an action to occur when only a portion of a number is part of the condition. The following is an example of a logical construct wherein a prompt for a PIN is given by the OCRR system in response to a called number that matches the pattern 555-555-XX5X; where the "X" represents a wild card digit.
if the Dialed Number is (555555XX5X) then prompt for PIN.

In another example, a number (555) 555-5555 is either busy, unanswered, or answered by a voice mail system causing a page to be sent to a paging system with a call back number, (666) 666-6666. The paging system in this example does not require a PIN.
if Dialed Number=555555555 and Disposition=(Busy OR Unanswered OR Answered By Answering Service) then page(5555555555, null, 6666666666).

Or the condition may be more complex. In the following example, a dial-around code, 10-10-555, is to be prepended to a called long distance number between 7 PM and 6 AM, and the dial-around code, 10-10-666, is prepended to a dialed number sequence for calls at other times so the call would be handled by a particular long distance service at the specified times.
if Disposition=LongDistance AND Time of Day>7 PM OR Time of Day<6 AM then
PrePend(1010555); else
PrePend(1010666).

A graphical user interface (GUI) could allow the input of this subscriber defined condition using a web client 109. While a GUI may be used by the subscriber, an alternate embodiment could allow a subscriber to provide outbound routing information to the SCP 103 via a scripting language such as JAVA, PERL, or shell. Scripts allow advanced customers the complete flexibility of the scripting language to control their outbound call routing. The scripts could even be stored locally on the subscriber's PC to enhance OCRR system updates and the subscriber's experience. To accommodate the scripts, the SMS 112 or web server 111 can function as a gateway to convert the scripts into a format the SCP 103 can process. The scripts can be uploaded to the SMS 112 in many ways including the use of the file transfer protocol (FTP) and the web server 111 which in turn uploads the converted script information to the SCP 103.

Once a condition has been met and the SCP 103 determines that outbound call rules have been triggered at step S202, the SCP 103 checks the outbound routing information to determine which action was selected by the subscriber. At step S203, the SCP 103 determines whether forwarding has been chosen by the subscriber.

If forwarding has been specified by the subscriber, the SCP 103 adds the forwarding number specified by the user to an AIN message at step 208 instructing the originating EO 101 to complete the call to the forwarding number at step S212. If forwarding has not been specified, the SCP 103 then determines whether a PIN entry activity has been specified by the subscriber at step S204.

If a PIN entry activity has been specified by the subscriber, the SCP 103 adds a PIN prompt command to an AIN message, step S209, and sends the AIN message to the originating EO 101 instructing the EO 101 to prompt for a PIN. In this case, a off hook delay trigger may launch an information collect command to the SCP. The SCP after determining that a PIN is required, may send a send to resource with an announcement ID and request to collect a specified amount of digits from the subscriber. The calling party then enters their PIN and the service switching point (SSP) returns the results in a resource clear message. The SCP 103 verifies the PIN prior to instructing the EO 101 to complete the call at step S212 using an AIN message, for example, an analyze route or continue AIN message. Having the SCP 103 verifying the PIN prior to call completion can serve several purposes. For example, a subscriber may wish to restrict calls to certain numbers so that only those in a household who know the PIN can complete certain types of calls. A common use includes parents preventing children from calling "900" or long distance calls.

In an alternate embodiment where the called user device 105 requires a PIN after call completion (e.g., when using a calling card for a long distance service), a SN/IP 113 is used to interact a calling card platform and provide the PIN. In this case, the call is instead handled by the SN/IP 113 after step S209. For example, a call may be to an "800" calling card service or made using a pre-paid service. In such a case, the calling card company or pre-paid service would then complete the call using the PIN. The SN/IP 113 could prompt the subscriber for the PIN or the SN/IP could already have the PIN stored and use the stored PIN to interact with the service requiring the PIN. If adding a PIN has not been specified by the subscriber, the SCP 103 then determines whether a page activity has been specified by the subscriber at step S205.

If a paging activity has been specified by the subscriber in response to, for example, an originating called party busy trigger or an originating no answer trigger, the SCP 103 adds a pager number to a SN/IP bound message, step S210, and sends the message, for example, including the pager number, PIN, and pager company, to the SN/IP 113 using a communications protocol such as TCP/IP with instruction to interact with the paging system 107. This may occur while the calling party is still waiting for the called party to answer. Alternatively, the message or alternate message including a text message could be sent from the SCP 103 to the SN/IP 113, from the SCP 103 to the paging system 107, or SN/IP 113 to the paging system 107 using E-mail. Any other system capable of forwarding text pages could also receive a message from the SCP 103. If paging was not specified by the subscriber, the SCP 103 then determines whether a dialing prefix was selected (e.g., dial-around number for a particular long distance access) at step S206.

If a prefix prepend activity has been specified by the subscriber, the SCP 103 adds a prefix number (e.g., dial-around number) to an AIN message, step S211, and sends the AIN message to the originating EO 101 with instruction to complete the call, at step S212. If a prepend prefix activity was not specified by the subscriber, the SCP 103 then determines whether a disallow activity was selected (e.g. blocking of long distance calls) at step S207.

If a disallow activity has been specified by the subscriber, the SCP 103 then advances to S216 to discontinue the call. If a disallow activity was not specified by the subscriber, the SCP 103 then advances to step S212; instructing the originating EO 101 to complete the call at step S212.

If, after step S212, the SCP 103 determines, at step S213, that a called device is busy, does not answer, or is answered by an answering system, the SCP 103 then again determines whether the OCRR service is to be invoked at step S202 and the process begins again. If, at step S213, the SCP 103 determines that a called device is answered (not by an answering machine) the OCRR service does nothing to interrupt the call or interfere with the call's natural progression to termination and the OCRR process ends at step S215.

In a further embodiment, the SCP 103 can make the determination that a call is answered based on a termination notification sent to the SCP 103. The termination notification may be generated after a send notification message is sent with a continue or analyze route message. Once this is done and the call is answered, a termination notification is sent to the SCP 103 to inform it that the call was answered. Alternatively, if a message is not received by the SCP 103 indicating busy or no answer, the SCP 103 may determine that a call was answered.

In an alternative embodiment more activities may occur, for example call logging could occur recording information relating to the disposition of a call. Moreover, in a further embodiment multiple actions could occur, for example, forwarding and logging could both be actions that occur for a given call.

The previous description of the OCRR logic flow of FIG. 2 is exemplary, but variations of the logic flow can occur without changing the function of the OCRR service. For example, steps S202-S207 can occur in any order. Moreover, if a condition is not associated with an action, a default action may occur, or the OCRR service may give a command to the originating EO 101 to terminate the call.

Subscriber Graphical User Interface

An exemplary GUI enabling a subscriber to enter conditions and actions into the OCRR system using a web client 109 is shown in FIG. 3. The OCRR system executes rules by performing actions when a condition is met. As shown in FIG. 3, a GUI allowing the input of a condition may include a variable type field 300, equality operator 301, variable input field 302, and logical operator 303. The GUI may also allow the input of a rule including an action that is to occur when the condition is met. An action input may include an action field 304, an action type field 305, an action input field 306, and a conditional operator 307. The GUI may be implemented using a web client, electronic mail system (e.g. Microsoft Outlook), or any other medium through which a GUI can be presented.

Entry into these fields creates a conditional statement and action statement. For example, if "Dialed Number" is entered in the variable type field 300, "=" is the selected equality operator 301, "Long Distance" is entered in the variable input field 302, "Prepend" is entered in the action field 304, "Dial-around code" is entered in the action type field 305, "1010555" is entered in the action input field 306, a logical construct is formed. The rule formed in the example includes a condition statement, "if the dialed number is a long distance number", and an action statement, "then prepend the dial-around code 1010555". In this case, the dial-around code is prepended to the dialed number sequence when the condition is met. The rule in this example used a simple logical construct to form the condition statement, however, more complex variations can be created using logical operator 303 and conditional operator 307 as shown in FIG. 3.

The variable type field 300 may be a pull-down menu with the following variable types: Number Dialed, NPA Dialed, NPA/NXX Dialed, Time of Day, Day of Week, Day of Year, Specific Date, or Call Disposition. The "Number Dialed" entry is the number that a subscriber may dial. This number may consist entirely of digits, or it may include wild card characters. The "NPA Dialed Number" is the dialed numbering plan area number, sometimes known as an area code. The "NPA/NXX Dialed" entry refers to the numbering plan area number dialed and the NXX refers to a prefix number dialed. For example, given a dialed number (555) 551-5522, the digits "555" are the NPA and the digits "551" are the NXX number. The "Time of Day", "Day of Week", and "Day of Year" entries refer to the time of day, day of week, and day of year, respectively, when a number is dialed. The "Call Disposition" entry refers to the status of the call such as call busy or disconnected, call not answered, call answered but not by an answering machine, or call answered by answering service.

The equality operator 301 may include the following symbolic operators: =, <, >, <>, <=, and <=; the symbols meaning "equal to", "less than", "greater than", "not equal to", "greater than or equal to", and "less than or equal to", respectively.

The variable input field 302 is an input field that allows a subscriber to input information in a format acceptable for the variable type field 300 and equality operator 301 chosen by the subscriber. For example, if "Dialed Number" is selected as the variable type and "=" is the equality operator, a telephone number or terms such as "Local", "Local Toll", or "Long Distance" may be input into the variable input field 302. In another example, if "Day of Week" is selected as the variable type, then Sunday through Monday may be input, whereas 7 PM or a telephone number are of improper format and may not be input. In a further example, if "Call Disposition" is selected as the variable type and "=" is the equality operator, a entry of The "Call Disposition" entry of "Busy", "Disconnected", "Not Answered", or "Answered By Service" may be input into the variable input field 302 while a telephone number may not be input.

The logical operator field 303 may be implemented using a pull-down menu as in FIG. 3. The logical operator 303 pull-down menu may include the following logical operators: "AND", "OR", and "NOT". These operators allow the subscriber to create complex logical conditions.

The action field 304 includes the actions a subscriber may choose the OCRR service to implement once the subscriber's conditions are met. The action field 304 may be implemented using a pull-down menu, as shown in FIG. 3. The action field 304 pull-down menu may include the following actions: "Forward", "PIN Entry", "Page", "Disallow", and "Prepend". A "Forward" selection indicates a call is to be forwarded to the number designated in the action input field 306. A "PIN Entry" selection indicates that a pin entry is to be sent to the device designated in the action input field 306. The "Page" entry indicates that a page with an optional message is to be sent to the paging system designated in the action input field 306. A "Disallow" selection indicates the call is to be terminated and that a data in the action input field 306 is not required. A "Prepend" selection indicates the information in the action input field 306 or a translation of the information (e.g., a dial-around code may be translated into information including more than one component such as carrierID=0220 and CarrierSelection=00000100) is to be prepended to the dialed number sequence or made part of the calling instruction. In a prepend operation, the information in the input field may be a dial around code, a series of numbers such as an "800" number followed by a calling card number or other information that may assist in making a call.

The action type field 305 may be implemented using a pull-down menu as shown in FIG. 3. The action type field 305 may include the following entries: "Dial-around Code", "Number", "PIN", and "Number and Message". These entries indicate what type of input is expected in the action input field 306.

The action input field 306 may be implemented as a data entry field as shown in FIG. 3. The action input field 306 allows a subscriber to enter information in a format corresponding to the action type. For example, if action is "Page" and the action type is "Number and Message", an action input field 306 entry of "(555) 555-5555, call me at (555) 555-2222" may be entered to reflect a page to (555) 555-5555 with instructions to send "call me at (555) 555-2222" to a paging device 108.

The condition operator 307 may be implemented using a pull-down menu as in FIG. 3. The logical operator 307 pull-down menu may include an "ELSE" operator and an "AND" operator. These operators allow the subscriber to create complex actions. If an "ELSE" statement is entered, an alternate action may be executed if the condition of the rule is not met. Moreover, the "ELSE" operator may be implemented using a pointer to another rule using, for example, a sequence number so that a subscriber may chain rules to form nested rule statements. If an "AND" operator is selected, multiple actions may occur, where reasonable, when the condition of the rule is met. For example, a subscriber could enter multiple page action commands to page a pool of numbers.

A property of the OCRR service is that rules have priority based, generally, on the order they are placed within the SCP 103. Rules that act based on a disposition (e.g. a terminating device is busy, unanswered, or answered by an answering service) are processed only after non-disposition rules. Rules will be processed until there are no more rules to process, unless, one of the actions taken on a rule whose condition was met is terminal (e.g., disallow a call or forward a call). Moreover, while the OCRR service may include rules based on any combination of numbers dialed, an originating EO 101 may include special routing such that certain numbers are not processed by the OCRR service. For example, calls to an information service (e.g., "411" service) may be processed by the OCRR service, while calls to an emergency service (e.g., "911" service) may not be processed by the OCRR service.

Another embodiment of the OCRR service may also include a logging system such as described in U.S. patent application Ser. No. 09/985,244 entitled "Call Management Reports" to TILIKS et al. The logging may include information related to the disposition of a call. For example, call information related to a call that was busy including the number dialed, time, and date.

Outbound Call Rules Routing

Figure 4:
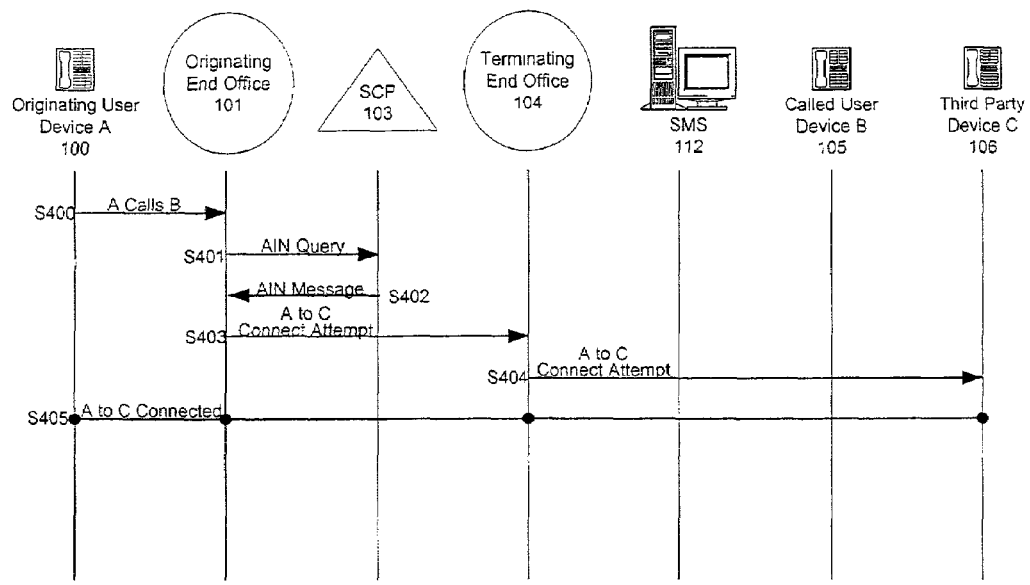
FIG. 4 is an exemplary call flow diagram in which a call is forwarded, according to an aspect of the present invention.

A further embodiment of the present invention is shown in FIG. 4. FIG. 4 is an exemplary call flow diagram showing a forwarded call. In this embodiment, an originating caller uses an originating user device 100 and places a call, step S400, to a called user's device 105. The call triggers in the originating EO 101, sending an AIN query to the outbound call rules routing (OCRR) service logic of the SCP 103 at step S401. Exemplary triggers for outgoing calls could be either a customized dialing plan (CDP) or Off Hook Delay (OHD) trigger. After executing the service logic in the SCP 103, an AIN message, send notification with a forwarding number for the third party device 106 is sent from the SCP 103 to the originator's EO 101 at step S402.

The originating end office 101 then attempts to connect the originating user device 100 to the third party device 106 by contacting the terminating end office 104 at step S403. The terminating end office 104 then attempts to connect the third party device 106 at step S404. When the third party device 106 is answered, the call between the originating user device 100 and the third party device 106 is connected at step S405.

Figure 5:
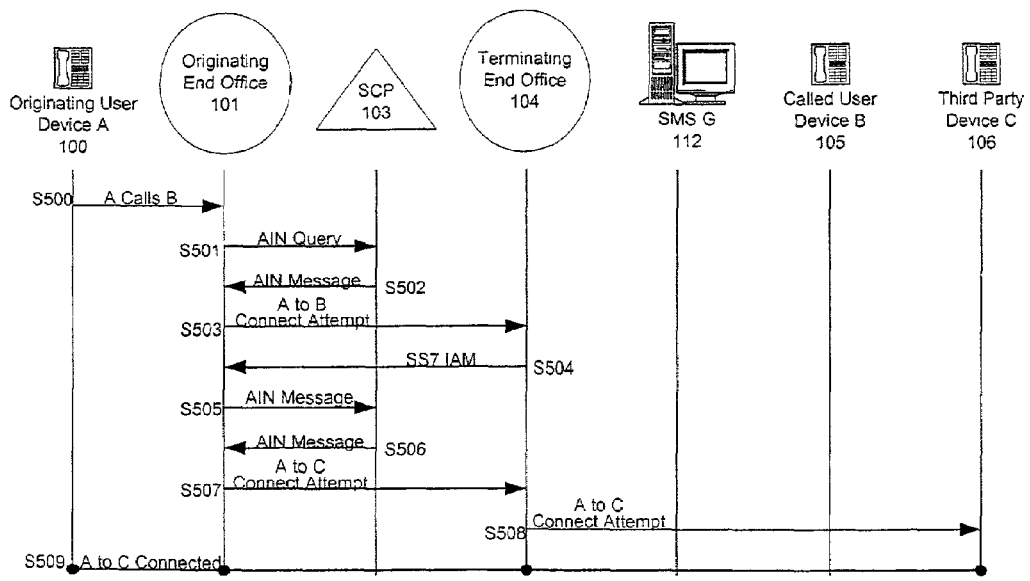
FIG. 5 is an exemplary call flow diagram in which a call is forwarded when a communications line is busy, according to an aspect of the present invention.

A further embodiment of the present invention is shown in FIG. 5. FIG. 5 is an exemplary call flow diagram showing a call forwarded when it is determined that the call is busy. In this embodiment, a subscriber's originating user device 100 places a call to a called user's device 105 at step S500. The call triggers in the originator's EO 101 sending an AIN query to the OCRR service logic of the SCP 103 at step S501. After executing the service logic, the SCP 103 sends an AIN message, e.g., send notification message, to the originator's EO 101 instructing the originating EO 101 to connect to the called user's EO 104 at step S502.

After the subscribing originating user device 100 connects with the terminating EO 104 at step S503 and the called user device 105 is busy, as is well known in the art, the terminating EO 104 sends an SS7 IAM with cause indicator of user busy to the originator's EO 101 at step S504 to let the originating caller and originating end office 101 know the line is busy. In Step S504, the busy indicator may also be generated and sent by any other network device between the originator's EO 101 and the terminating EO 104 to indicate that the call cannot be completed. The originating EO 101 then sends an AIN message, such as originating called party busy trigger information, to the SCP 103 at step S505. The echo data functionality of the AIN message, e.g., the originating user device 100 number and the called user device 105, are used by the OCRR service logic to determine what to do next. The AIN message also includes information that notifies the OCRR logic of the SCP 103 that the called user device 105 was busy. Once the SCP 103 determines that the call should be forwarded to the third party device 106, the SCP 103 sends an AIN message, e.g., analyze route notification with the forwarding number for the third party device 106, to the originating end office 101 at step S506.

The originating end office 101 then attempts to connect the originating user device 100 to the third party device 106 by contacting the terminating end office 104 at step S507. The terminating end office 104 then attempts to connect to the third party device 106 at step S508. When the third party device 106 is answered, the call between the originating user device 100 and the third party device 106 is connected at step S509.

Figure 6:
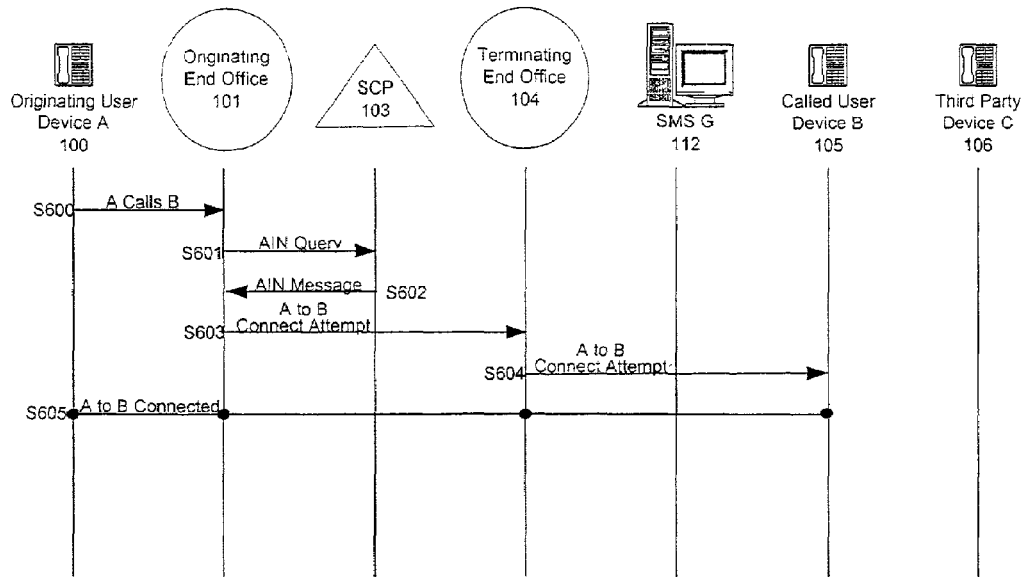
FIG. 6 is an exemplary call flow diagram where a dial around number is used, according to an aspect of the present invention.

A further embodiment of the present invention is shown in FIG. 6. FIG. 6 is an exemplary call flow diagram showing a call including either a dial-around code, or other input combination. In this embodiment, an originating caller uses an originating user device 100 and places a call, step S600, to a called user's device 105. The call triggers in the originating EO 101, sending an AIN query to the OCRR service logic of the SCP 103 at step S601. An AIN message, e.g., analyze route notification, is sent with dial-around code information to the originator's EO 101 at step S602. In this case, a carrier parameter may need to be modified so that the end result is as if the subscriber picked up their phone and dialed the dial-around code just prior to the called party's number. For this to occur, the carrier parameter is typically divided into two fields, carrier ID and carrier selection. An exemplary communications flow could be an info collect message from the originating EO 101 to the SCP 103 such that the called party ID="5555555555".

The originating end office 101 then attempts to connect the originating user device 100 to the called user's device 105 by contacting the terminating end office 104 at step 603. In the case that a dial-around number is used (e.g., a long distance service access number), the dial-around number is first invoked by the originating end office 101 to execute the dial-around. To simulate the calling party dialing the dial-around code, "1010-220", an analyze route response message from the SCP 103 to the originating EO 101 may include the called party ID="5555555555" with a carrier ID="0220", and a carrier selection="00000100". The terminating end office 104 then attempts to connect to the called user's device 105 at step S604. When the called user's device 105 is answered, the call between the originating user device 100 and the called user's device 105 is connected at step S605. The SCP logic is further described with respect to FIG. 2.

To prepend other numbers like an area code, an info collect message may be used where a called party ID="6666666". Based on a subscriber's rule, the subscriber may have directed a "666" be prepended to the number. In this case, the called party ID is simply modified to be "6666666666" in an analyze route response message from the SCP 103 to the originating EO 101.

Figure 7:
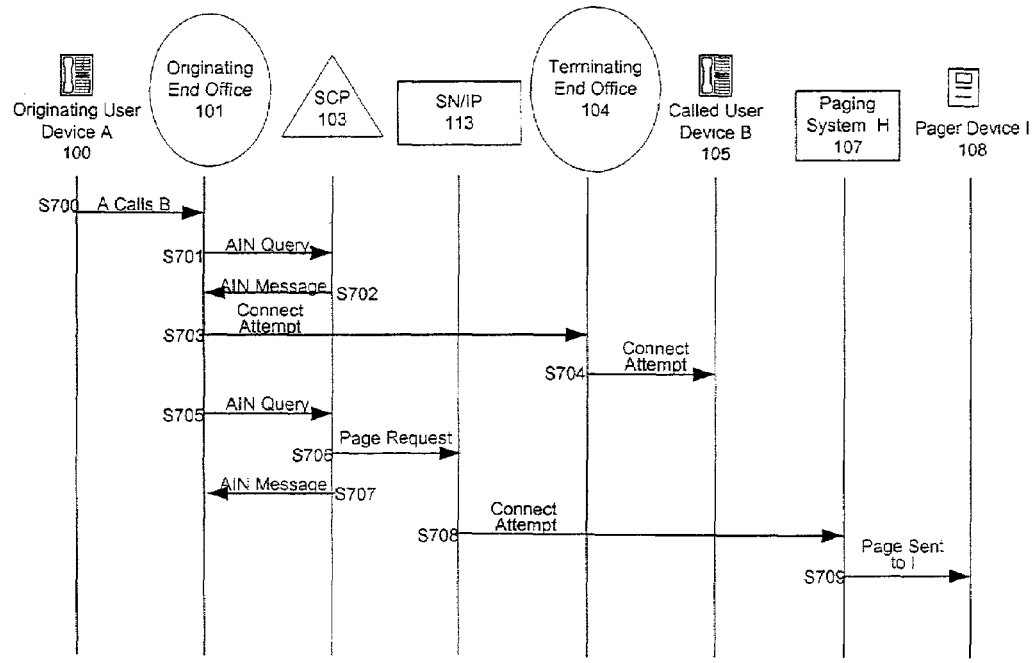
FIG. 7 is an exemplary call flow diagram in which a page is initiated when a call is unanswered, according to an aspect of the present invention.

A further embodiment of the present invention is shown in FIG. 7. FIG. 7 is an exemplary call flow diagram showing a paging system being invoked when a call initiated by the originating user device 100 to a called user device 105 is unanswered. In this embodiment, a subscriber's originating user device 100 places a call to a called user's device 105 at step S700. The call triggers in the originator's EO 101 sending an AIN query, e.g., off hook delay/info collect message, to the OCRR service logic of the SCP 103 at step S701. An AIN message, e.g., continue, is then sent from the SCP 103 to the originator's EO 101 at step S702 which in turn contacts the terminating end office 104 to further the call connection at steps S703 and S704.

After the subscribing originating user device 100 contacts the called user's device 105 at step S704, the called party does not answer, and a preset time in an EO 101 timer expires, the originator's EO 101 sends an AIN message, such as a originating no answer query, to the SCP 103 at step S705.

Subsequently, the SCP 103 determines the telephone number of the paging system 107 and any message designated by the subscriber to the paging device (e.g., the originating user device number) and forwards the information to the SN/IP 113 at step S706 using a communications protocol such as TCP/IP. An AIN message is then sent from the SCP 103 to the originating EO 101 instructing the EO 101 to continue at step S707; at this point the calling party may continue to hear ringing and the called party's line may continue to ring. The SN/IP 113 then attempts to call the paging system 107 at step S708; the SN/IP 113 may or may not output a message (e.g., a PIN) to the paging system 107 at this time depending on SCP 103 instruction which is based on subscriber rules. The paging system 107 then connects to the pager device 108 to complete the page and transmits any message from the applicable subscriber's rule at step S709.

Figure 8:
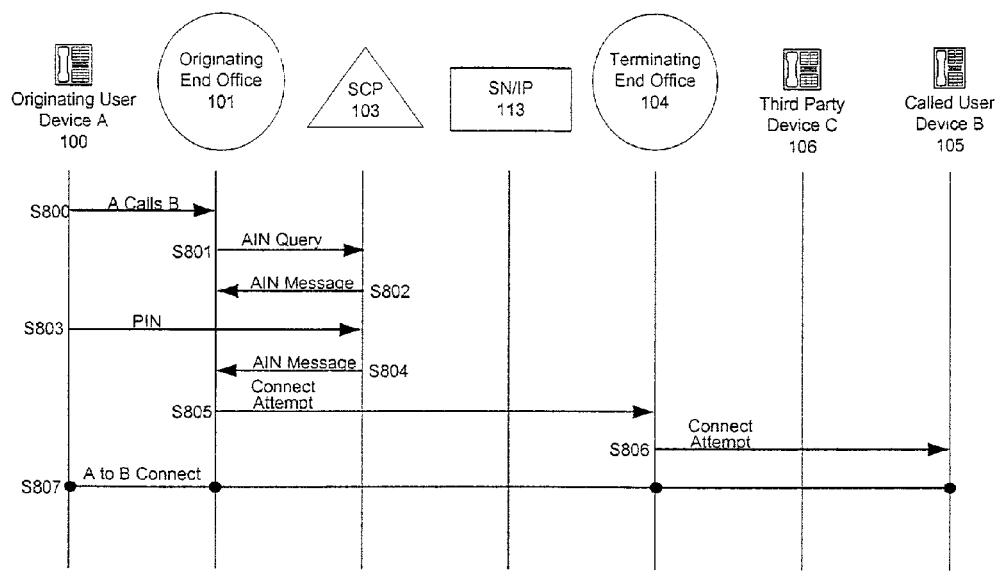
FIG. 8 is an exemplary call flow diagram in which a PIN is used to access a system, according to an aspect of the present invention.

A further embodiment of the present invention is shown in FIG. 8. FIG. 8 is an exemplary call flow diagram showing a prompt for a PIN when a call initiated by the originating user device 100 to a called user device 105 requires a PIN. In this embodiment, a subscriber's originating user device 100 places a call to a called user's device 105 at step S800. The call triggers in the originator's EO 101 sending an AIN query (e.g., off hook delay—information collect message) to the OCRR service logic of the SCP 103 at step S801. When the SCP 103 determines that the subscriber has designated the called number as requiring a PIN, the SCP 103 sends an AIN message (e.g., send to resource, play announcement, and collect digits) to the originating EO 101, step S802, which in turn prompts the subscriber for a PIN. Once a PIN is entered by the subscriber, it is sent to originating EO 101 which in turn sends AIN message (e.g., resource clear with digits entered) to the SCP 103 at step S803. The SCP 103 then determines if the PIN is correct and, if so, sends an AIN message instructing the originating EO 101 to complete the call at step S804. The call then continues as normal, wherein, the originating EO 101 connects to the terminating EO 104, step S805, and the terminating EO connects to the called user device 105, step S806. Thus, the connection is provided between the originating user device 100 and the called user device at step S807. An alternative embodiment could be implemented using the SN/IP 113 to provide PINs or other more complex access entries and interactions to gain access to a called party's resource.

Figure 9:
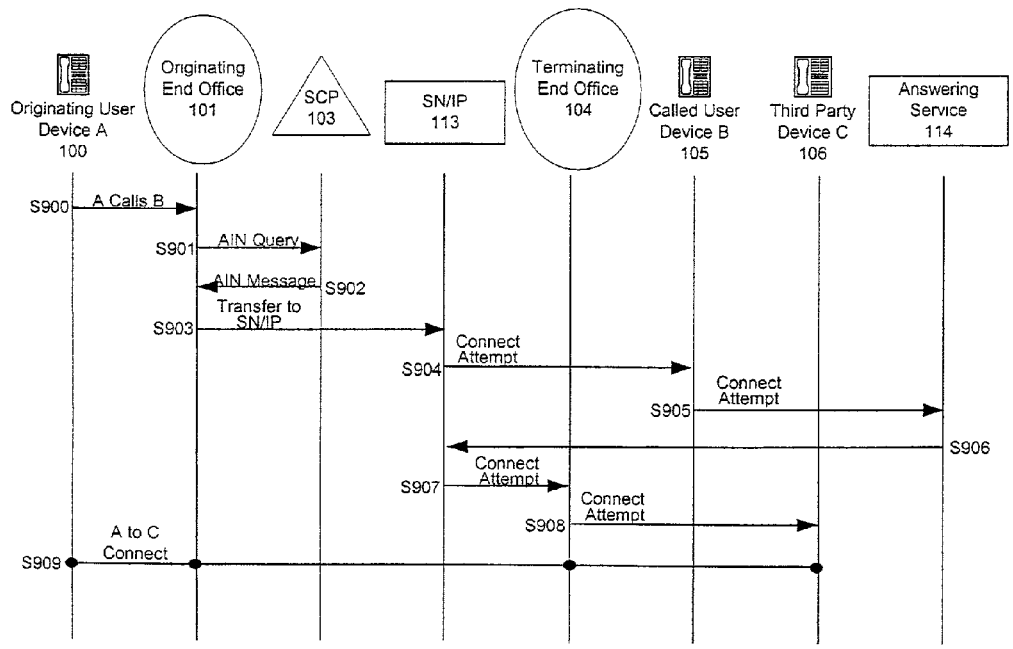
FIG. 9 is an exemplary call flow diagram in which an answering service is reached and a call is subsequently forwarded to a third party device, according to an aspect of the present invention.

A further embodiment of the present invention is shown in FIG. 9. FIG. 9 is an exemplary call flow diagram showing an answering system being accessed and causing the OCRR service to forward the call to a third party device 106. In this embodiment, a subscriber's originating user device 100 places a call to a called user's device 105 at step S900. The call triggers in the originator's EO 101 sending an AIN query to the OCRR service logic of the SCP 103 at step S901. In this example, the SCP 103 determines that, based on the call information, a rule is applicable that includes a condition including a call disposition where an answering system is reached. In this case, the SCP 103 determines that it should hand the call off to the SN/IP 113 to determine if an answering machine is actually reached. An AIN message, e.g., analyze route, is then sent to the originator's EO 101, step S902, which in turn contacts the SN/IP 113 at step S903 to continue the call. When the called user device 105 is contacted, step S904, and either the called user device 105 or terminating EO 104 determines that the call should be routed to an answering service, the SN/IP 113 then connects to the answering service 114 at step S905. The SN/IP 113 then determines whether an answering service 114 is actually reached by listening to responses from the answering service 114 at step S906. If the SN/IP determines that it is indeed connected to an answering service (e.g., it hears more than 5 seconds of speech or a specified DTMF tone), it then terminates the call to the answering service, step S907. The SN/IP 113, then connects the caller to a third party device 106 as determined by the subscriber's applicable rule at steps S908 and S909. The SN/IP 113, having bridged the connection between the originating user device 100 and called user device 105, is enabled to determine how to execute a subscriber's rule by either having access to the subscriber's outbound call rule information or the pertinent information may be transmitted from the SCP 103 over a TCP/IP connection to the SN/IP 113 via a message (e.g., analyze route message).

Figure 10:
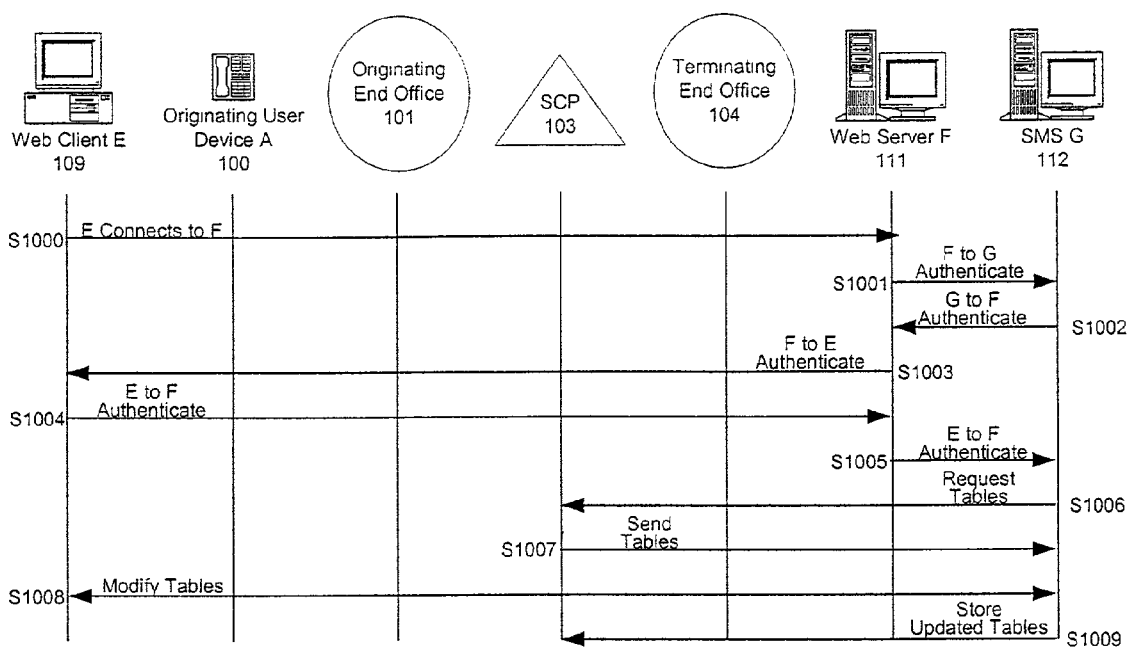
FIG. 10 is an exemplary call flow diagram in which a subscriber's SCP routing table is updated, according to an aspect of the present invention.

A further embodiment of the present invention is shown in FIG. 10 showing an exemplary call flow for a subscriber updating the SCP OCRR information according to an aspect of the present invention. At step S1000, the subscriber connects from the web client 109 to the web server 111 through a network such as the Internet 110. The web server 111 then connects to the SMS 112, which stores and updates the OCRR data, at step S1001. Once connected to the SMS 112 via the web server 111, the subscriber must be authenticated to access the corresponding service account. The SMS 112 queries the subscriber for authentication data, which may include an account number and an associated account access PIN, via the web server 111 at steps S1002 and S1003.

The subscriber authentication responses are received at the web server 111 at step S1004 and forwarded to the SMS 112 for authentication at step S1005. Alternatively, web server 111 may perform the authentication step based on information sent from the SMS 112. The SMS 112 retrieves the account number and associated account access PIN to confirm that the subscriber is authorized to access the account information.

After a successful authentication, the SMS 112 queries the SCP 103 to retrieve the data associated with the subscriber's OCRR service account at step S1006. The SCP 103 then retrieves the outbound call routing information and sends it to the SMS 112 at step S1007. In an embodiment of the invention, the SMS 112 maintains a database of all of the OCRR service data related to each subscriber, and merely updates the data from SCP 103 during each interaction. Alternatively, the SCP 103 periodically transmits all OCRR service data related to each subscriber regardless of whether the subscribers have actually requested their respective account data from the SMS 112. The SMS 112 would then be able to provide the subscriber with relatively recent data without performing steps S1006 and S1007, which saves additional processing by the SCP 23. Steps S1006 and S1007 would be performed only when the subscriber specifically requests the most recent data or real time interaction, discussed below.

Once the SMS 112 has the call monitoring service data related to the subscriber's account, an interactive connection is maintained at step S1008 among the SMS 112, the web server 111 and the web client 109. For example, the web server 111 receives HTTP messages from the subscriber at web client 109 and provides HTML web pages in response to the subscriber's input. The web pages relate to the subscriber's OCRR service, as indicated by the SMS 112. Whenever the subscriber confirms an order to change their rule information, the SMS 112 automatically updates the SCP 103 at step S1009 with the updated information provided by the subscriber. The SMS 112 may also provide updated information to the SCP 103 while the subscriber is still on-line, either periodically or in response to a specific command by the subscriber to do so. The SCP 103 stores the updated information received from the SMS 112 for immediate implementation in the PSTN. The SMS 112 may also be used to update the SN/IP 113 in a similar way.

The invention uses switch triggers, throughout, to determine whether a condition has been met. Further, actions can be carried out in some cases by using standard AIN responses to these triggers (e.g., Analyze Route trigger to forward a call, Disconnect trigger to disallow a call, Send To Resource trigger to prompt for a pin); others can be carried out by an adjunct such as a SN/IP, which can be contacted to be informed what to do (e.g., page a number with specified digits).

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

What is claimed is:

1. A communication processor for controlling an outbound communication, comprising:
   a memory that stores outbound communication rule information for a rule that is configurable by a subscriber to a service with which the outbound communication is originated, that governs processing for the outbound communication, and that includes a condition and an action to be taken for the outbound communication when the condition is satisfied; and
   a sender that sends, in response to receiving a network device message from a network device which receives the outbound communication and sends the network device message to the communication processor when the condition is satisfied, a communication processor message including the action to be taken for controlling the outbound communication.

2. The communication processor of claim 1,
   wherein the outbound communication rule information is configurable over the internet.

3. The communication processor of claim 1,
wherein the service is a telecommunications service, and
wherein the subscriber is a subscriber to the telecommunications service.

4. The communications processor of claim 1,
wherein the action relates to forwarding the outbound communication.

5. The communication processor of claim 1,
wherein the action relates to requiring submission of a personal identification (PIN) number.

6. The communication processor of claim 1,
wherein the outbound communication rule information is configurable for a subscriber using a web browser.

7. The communication processor of claim 1,
wherein the action relates to disallowing the outbound communication.

8. The communication processor of claim 1,
wherein the action relates to routing the outbound communication via a carrier associated with a dial-around code.

9. The communication processor of claim 1,
wherein the outbound communication rule information comprises a plurality of actions.

10. The communication processor of claim 1,
wherein the outbound communication rule information comprises a plurality of conditions.

11. The communication processor of claim 1,
wherein the outbound communication rule information comprises a plurality of rules.

12. A method for controlling an outbound communication, comprising:
    storing outbound communication rule information for a rule that is configurable by a subscriber responsible to a service with which the outbound communication is originated, that governs processing for the outbound communication, and that includes a condition and an action to be taken for the outbound communication when the condition is satisfied; and
    sending, in response to receiving a network device message from a network device which receives the outbound communication and sends the network device message to the communication processor when the condition is satisfied, a communication processor message including the action to be taken for controlling the outbound communication.

13. The method of claim 12,
wherein the network device initiates an action in response to receiving the communication processor message.

14. The method of claim 12, further comprising:
determining whether at least a portion of a dialed number satisfies a condition of the outbound communication rule information.

15. The method of claim 14,
wherein the network device forwards the outbound communication to a number other than the dialed number based on the action of the outbound communication rule information.

16. The method of claim 12,
wherein the action relates to blocking the outbound communication when the outbound communication is to a destination indicated by the condition.

17. The method of claim 12,
wherein a page is sent to a paging device based on the action of the outbound communication rule information.

18. The method of claim 12,
wherein the outbound communication rule information is configurable by the subscriber via a service management system.

19. The method of claim 12,
wherein the outbound communication rule information is configurable by the subscriber via a web server.

20. The method of claim 19,
wherein the outbound communication rule information is configurable via the web server by the subscriber using a web client.

21. The method of claim 12,
wherein the network device initiates a plurality of actions to be taken based on the action.

22. The method of claim 12, further comprising:
determining whether outbound communication information in the communication processor message satisfies a plurality of conditions.

23. The method of claim 12, further comprising:
determining whether outbound communication information in the communication processor message satisfies conditions of a plurality of rules.

\* \* \* \* \*